United States Patent
Tan et al.

(10) Patent No.: US 11,893,491 B2
(45) Date of Patent: Feb. 6, 2024

(54) COMPOUND MODEL SCALING FOR NEURAL NETWORKS

(71) Applicant: Google LLC, Mountain View, CA (US)

(72) Inventors: Mingxing Tan, Newark, CA (US); Quoc V. Le, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 485 days.

(21) Appl. No.: 17/144,450

(22) Filed: Jan. 8, 2021

(65) Prior Publication Data

US 2021/0133578 A1 May 6, 2021

Related U.S. Application Data

(63) Continuation of application No. 16/751,081, filed on Jan. 23, 2020, now Pat. No. 10,909,457.

(60) Provisional application No. 62/796,034, filed on Jan. 23, 2019.

(51) Int. Cl.
*G06N 3/04* (2023.01)
*G06N 3/082* (2023.01)

(52) U.S. Cl.
CPC ............ *G06N 3/082* (2013.01); *G06N 3/04* (2013.01)

(58) Field of Classification Search
None
See application file for complete search history.

(56) References Cited

FOREIGN PATENT DOCUMENTS

| JP | H05-108593 | 4/1993 |
|---|---|---|
| JP | H09-91263 | 4/1997 |
| JP | 2017-37392 | 2/2017 |
| JP | 2019533257 A | 11/2019 |

OTHER PUBLICATIONS

Howard et al ("MobileNets: Efficient Convolutional Neural Networks for Mobile Vision Applications" 2017) (Year: 2017).*
Sandler et al ("MobileNetV2: Inverted Residuals and Linear Bottlenecks" 2018) (Year: 2018).*
(Continued)

*Primary Examiner* — Lut Wong
(74) *Attorney, Agent, or Firm* — Fish & Richardson P.C.

(57) ABSTRACT

A method for determining a final architecture for a neural network to perform a particular machine learning task is described. The method includes receiving a baseline architecture for the neural network, wherein the baseline architecture has a network width dimension, a network depth dimension, and a resolution dimension; receiving data defining a compound coefficient that controls extra computational resources used for scaling the baseline architecture; performing a search to determine a baseline width, depth and resolution coefficient that specify how to assign the extra computational resources to the network width, depth and resolution dimensions of the baseline architecture, respectively; determining a width, depth and resolution coefficient based on the baseline width, depth, and resolution coefficient and the compound coefficient; and generating the final architecture that scales the network width, network depth, and resolution dimensions of the baseline architecture based on the corresponding width, depth, and resolution coefficients.

19 Claims, 4 Drawing Sheets

(56) References Cited

OTHER PUBLICATIONS

JP Office Action in Japanese Appln. No. 2021-542494, dated Oct. 11, 2022, 11 pages (with English Translation).
Berg et al., "Birdsnap: Large-scale Fine-grained Visual Categorization of Birds," 2014 IEEE Conference on Computer Vision and Pattern Recognition, Sep. 2014, 8 pages.
Bossard et al., "Food-101-Mining Discriminative Components with Random Forests," ECCV, Sep. 2014, 16 pages.
Cai et al., "ProxylessNAS: Direct Neural Architecture Search on Target Task and Hardware," https://arxiv.org/abs/1812.00332, Feb. 2019, 13 pages.
Chollet, "Xception: Deep Learning with Depthwise Separable Convolutions," 2017 IEEE Conference on Computer Vision and Pattern Recognition (CVPR), Jul. 2017, 1800-1807.
Cubuk et al., "AutoAugment: Learning Augmentation Strategies From Data," 2019 IEEE/CVF Conference on Computer Vision and Pattern Recognition (CVPR), Jun. 2019, 113-123.
Elfwing et al., "Sigmoid-weighted linear units for neural network function approximation in reinforcement learning," Neural Networks, Nov. 2018, 107:3-11.
Gholami et al., "SqueezeNext: Hardware-Aware Neural Network Design," 2018 IEEE/CVF Conference on Computer Vision and Pattern Recognition Workshops (CVPRW), Jun. 2018, 1719-1728.
Han et al., "Deep Compression: Compressing Deep Neural Networks with Pruning, Trained Quantization and Huffman Coding," https://arxiv.org/abs/1510.00149, Feb. 2016, 14 pages.
He et al., "AMC: AutoML for Model Compression and Acceleration on Mobile Devices," The European Conference on Computer Vision (ECCV), 2018, 17 pages.
He et al., "Deep Residual Learning for Image Recognition," 2016 IEEE Conference on Computer Vision and Pattern Recognition (CVPR), Jun. 2016, 770-778.
He et al., "Mask R-CNN," 2017 IEEE International Conference on Computer Vision (ICCV), Oct. 2017, 2980-2988.
Howard et al., "MobileNets: Efficient Convolutional Neural Networks for Mobile Vision Applications," https://arxiv.org/abs/1704.04861, Apr. 2017, 9 pages.
Hu et al., "Squeeze-and-Excitation Networks," 2018 IEEE/CVF Conference on Computer Vision and Pattern Recognition, Jun. 2018, 7132-7141.
Huang et al., "Deep Networks with Stochastic Depth," ECCV, Oct. 2016, 646-661.
Huang et al., "Densely Connected Convolutional Networks," 2017 IEEE Conference on Computer Vision and Pattern Recognition (CVPR), Jul. 2017, 2261-2269.
Huang et al., "GPipe: Efficient Training of Giant Neural Networks using Pipeline Parallelism," https://arxiv.org/abs/1811.06965v4, Dec. 2018, 11 pages.
Iandola et al., "SqueezeNet: AlexNet-level accuracy with 50x fewer parameters and <0.5MB model size," https://arxiv.org/abs/1602.07360, Nov. 2016, 13 pages.
Ioffe et al., "Batch Normalization: Accelerating Deep Network Training by Reducing Internal Covariate Shift," Proceedings of the 32nd International Conference on Machine Learning, Jun. 2015, 9 pages.
Kornblith et al., "Do Better ImageNet Models Transfer Better?" 2019 IEEE/CVF Conference on Computer Vision and Pattern Recognition (CVPR), Jun. 2019, 2661-2671.
Krause et al., "Collecting a Large-Scale Dataset of Fine-Grained Cars," retrieved from URL <http://ai.stanford.edu/~jkrause/papers/fgvc13.pdf>, 2013, 2 pages.
Krizhevsky et al., "ImageNet Classification with Deep Convolutional Neural Networks," retrieved from URL <http://vision.cse.psu.edu/people/chrisF/deep-learning/Papers/KrizhevskyNIPS12Imagenet.pdf>, 2012, 9 pages.
Krizhevsky, "Learning Multiple Layers of Features from Tiny Images," retrieved from URL <https://pdfs.semanticscholar.org/5d90/f06bb70a0a3dced62413346235c02b1aa086.pdf>, Apr. 2009, 60 pages.

Lin et al., "Feature Pyramid Networks for Object Detection," 2017 IEEE Conference on Computer Vision and Pattern Recognition (CVPR), Jul. 2017, 936-944.
Lin et al., "ResNet with one-neuron hidden layers is a Universal Approximator," https://arxiv.org/abs/1806.10909, Jul. 2018, 21 pages.
Liu et al., "Progressive Neural Architecture Search," ECCV, Sep. 2018, 19-35.
Lu et al., "The Expressive Power of Neural Networks: A View from the Width," https://arxiv.org/abs/1709.02540, last revised Nov. 2017, 21 pages.
Loshchilov et al ("CMA-ES for Hyperparameter Optimization of Deep Neural Networks" 2016) (Year: 2016).
Ma et al., "ShuffleNet V2: Practical Guidelines for Efficient CNN Architecture Design," ECCV, Sep. 2018, 122-138.
Mahajan et al., "Exploring the Limits of Weakly Supervised Pretraining," https://arxiv.org/abs/1805.00932, May 2018, 23 pages.
Maji et al., "Fine-Grained Visual Classification of Aircraft," https://arxiv.org/abs/1306.5151, Jun. 2013, 6 pages.
Ngiam et al., "Domain Adaptive Transfer Learning with Specialist Models," https://arxiv.org/abs/1811.07056, last revised Dec. 2018, 10 pages.
Nilsback et al., "Automated Flower Classification over a Large Number of Classes," 2008 Sixth Indian Conference on Computer Vision, Graphics & Image Processing, Dec. 2008, 722-729.
Parkhi et al., "Cats and Dogs," 2012 IEEE Conference on Computer Vision and Pattern Recognition, Jun. 2012, 3498-3505.
PCT International Search Report and Written Opinion in International Application No. PCT/US2020/014839, dated May 7, 2020, 15 pages.
Raghu et al., "On the expressive power of deep neural networks," International Conference on Machine Learning, Aug. 2017, 8 pages.
Ramachandran et al., "Searching for Activation Functions," https://arxiv.org/abs/1710.05941, Oct. 2017, 13 pages.
Real et al., "Regularized Evolution for Image Classifier Architecture Search," AAAI, Jul. 2019, 4780-4789.
Russakovsky et al., "ImageNet Large Scale Visual Recognition Challenge," International Journal of Computer Vision, Apr. 2015, 42 pages.
Sandler et al., "MobileNetV2: Inverted Residuals and Linear Bottlenecks," 2018 IEEE/CVF Conference on Computer Vision and Pattern Recognition, Jun. 2018, 4510-4520.
Sharir et al., "On the Expressive Power of Overlapping Architectures of Deep Learning," https://arxiv.org/abs/1703.02065, last revised Feb. 2018, 24 pages.
Srivastava et al., "Dropout: a simple way to prevent neural networks from overfitting," The Journal of Machine Learning Research, Jan. 2014, 15(1):1929-1958.
Szegedy et al., "Going deeper with convolutions," 2015 IEEE Conference on Computer Vision and Pattern Recognition (CVPR), Jun. 2015, 9 pages.
Szegedy et al., "Inception-v4, Inception-ResNet and the Impact of Residual Connections on Learning," AAAI, Feb. 2017, 4278-4284.
Szegedy et al., "Rethinking the Inception Architecture for Computer Vision," 2016 IEEE Conference on Computer Vision and Pattern Recognition (CVPR), Jun. 2016, 2818-2826.
Tan et al., "MnasNet: Platform—Aware Neural Architecture Search for Mobile," 2019 IEEE/CVF Conference on Computer Vision and Pattern Recognition (CVPR), Jun. 2019, 2815-2823.
Xie et al., "Aggregated Residual Transformations for Deep Neural Networks," 2017 IEEE Conference on Computer Vision and Pattern Recognition (CVPR), Jul. 2017, 5987-5995.
Yang et al., "NetAdapt: Platform—Aware Neural Network Adaptation for Mobile Applications," ECCV, Oct. 2018, 16 pages.
Yu et al ("Slimmable Neural Networks" Dec. 2018) (Year: 2018).
Zagoruyko et al., "Wide Residual Networks" BMVC, 2016, 12 pages.
Zhang et al., "PolyNet: A Pursuit of Structural Diversity in Very Deep Networks," 2017 IEEE Conference on Computer Vision and Pattern Recognition (CVPR), Jul. 2017, 3900-3908.
Zhang et al., "ShuffleNet: An Extremely Efficient Convolutional Neural Network for Mobile Devices," 2018 IEEE/CVF Conference on Computer Vision and Pattern Recognition, Jun. 2018, 6848-6856.

(56) References Cited

OTHER PUBLICATIONS

Zhou et al., "Learning Deep Features for Discriminative Localization," 2016 IEEE Conference on Computer Vision and Pattern Recognition (CVPR), Jun. 2016, 2921-2929.
Zoph et al., "Learning Transferable Architectures for Scalable Image Recognition," 2018 IEEE/CVF Conference on Computer Vision and Pattern Recognition, Jun. 2018, 8697-8710.
Zoph et al., "Neural Architecture Search with Reinforcement Learning," https://arxiv.org/abs/1611.01578, last revised Feb. 2017, 16 pages.
PCT International Preliminary Report of Patentability in International Application No. PCT/US2020/014839, dated Aug. 5, 2021, 9 pages.

* cited by examiner

COMPOUND MODEL SCALING FOR NEURAL NETWORKS

CROSS-REFERENCE TO RELATED APPLICATION

This application is a continuation and claims priority to U.S. Ser. No. 16/751,081, filed on Jan. 23, 2020, now U.S. Pat. No. 10,909,457, issued on Feb. 2, 2021, which claims priority to U.S. Provisional Application Ser. No. 62/796,034, filed on Jan. 23, 2019. The disclosures of the prior applications are considered part of and are incorporated by reference in the disclosure of this application.

BACKGROUND

This specification relates to determining architectures for convolutional neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a long short term (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification describes a system implemented as computer programs on one or more computers in one or more locations that determines, from a baseline architecture, a final architecture for a neural network. As explained below, the final architecture is determined based on a target computational resource usage of the final architecture. As such, the system may determine a final architecture that fits the low level computational resources (e.g. the number of floating point operations per second, FLOPS) that are available for use by the final architecture. Furthermore, it may do so in a way that is more efficient than conventional approaches, which may require extensive hyper-parameter tuning. The neural network is configured to perform a particular machine learning task, such as but not limited to image processing (e.g. image classification).

The subject matter described in this specification can be implemented in particular embodiments so as to realize one or more of the following advantages. Convolutional neural networks are commonly developed at a fixed computational cost, and then scaled up to larger networks for better accuracy if more resources are given. The model scaling techniques described in this specification use a simple but highly effective compound coefficient for scaling a baseline neural network model to a target model given target resource constraints while maintaining model efficiency. Conventional methods arbitrarily increase network width, or depth, or resolution while scaling, which results in low accuracy and efficiency and makes the process of scaling up neural network models inefficient and computationally expensive due to the required hyper-parameter tuning to balance these three factors. In contrast, the described techniques linearly scale network width, depth, and resolution of a baseline model using a compound coefficient, thus avoiding spending significant computational resources for hyper-parameter tuning. In addition, the model scaling techniques described herein allow the baseline model to be scaled up very effectively, resulting in larger models that surpass state-of-the-art accuracy while having fewer parameters than previous state-of-the-art models. At the same time, these larger models can perform a particular machine learning task using fewer operations than previous state-of-the-art models use, and therefore they are faster on training and inference.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a neural architecture search system implemented as computer programs on one or more computers in one or more locations that determines, from a baseline architecture, a final architecture for a neural network. The neural network is configured to perform a particular machine learning task.

In general, the neural network is configured to receive a network input and to process the network input to generate a network output for the input.

In some cases, the neural network is a convolutional neural network that is configured to receive an input image and to process the input image to generate a network output for the input image, i.e., to perform some kind of image processing task.

For example, the task may be image classification and the output generated by the neural network for a given image may be scores for each of a set of object categories, with each score representing an estimated likelihood that the image contains an image of an object belonging to the category.

As another example, the task can be image embedding generation and the output generated by the neural network can be a numeric embedding of the input image. For instance, the proximity in embedding space between embeddings generated for respective input images may be representative of the similarity between those images.

As yet another example, the task can be object detection and the output generated by the neural network can identify locations in the input image at which particular types of objects are depicted.

In some other cases, the task can be video classification and the neural network is configured to receive as input a video or a portion of a video and to generate an output that determines what topic or topics that the input video or video portion relates to.

In some other cases, the task can be speech recognition and the neural network is configured to receive as input audio data and to generate an output that determines, for a given spoken utterance, the term or terms that the utterance represents.

In some other cases, the task can be text classification and the neural network is configured to receive an input text segment and to generate an output that determines what topic or topics an input text segment relates to.

Figure 1:
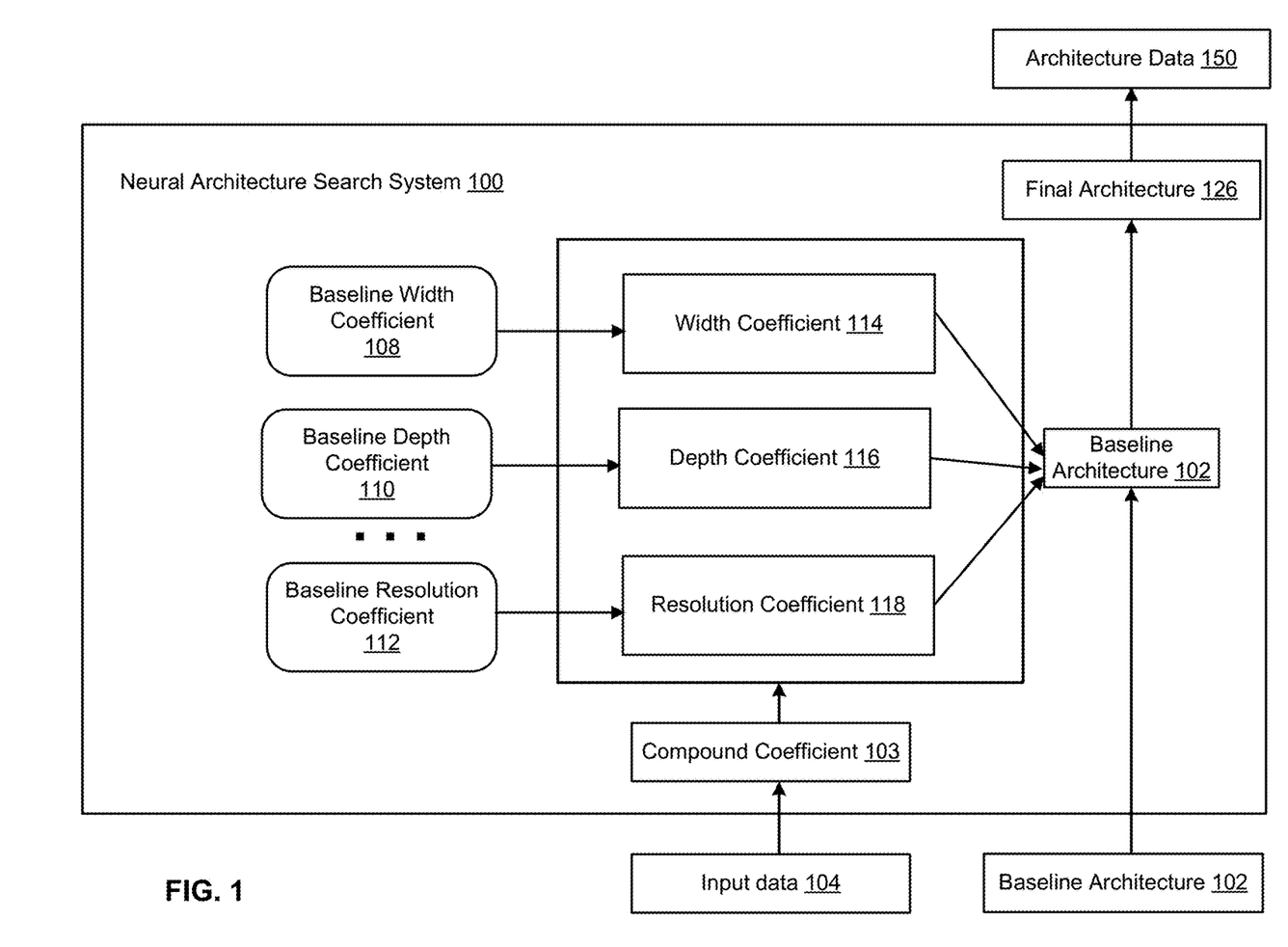
FIG. 1 shows an example neural architecture search system for determining a final architecture for a neural network to perform a particular machine learning task.

FIG. 1 shows an example neural architecture search system 100 configured to determine, from a baseline architecture, a final architecture for a neural network that is configured to perform a particular machine learning task. The neural architecture search system 100 is an example of a system implemented as computer programs on one or more computers in one or more locations, in which the systems, components, and techniques described below can be implemented.

Generally, the neural architecture search system 100 is a system that obtains a baseline architecture 102 of a neural network and input data 104 that defines a compound coefficient 103 that controls extra computational resources used for scaling the baseline architecture, uniformly scales all dimensions of the baseline architecture 102 using the simple yet highly effective compound coefficient to generate a final architecture 126 for the neural network to perform the particular machine learning task.

The system 100 can receive the baseline architecture 102 and the input data 104 in any of a variety of ways. For example, the system 100 can receive the baseline architecture 102 and the target resource usage data 104 as an upload from a remote user of the system over a data communication network, e.g., using an application programming interface (API) made available by the system 100. As another example, the system 100 can receive an input from a user specifying which data that is already maintained by the system 100 should be used as data identifying the baseline architecture 102 and as the target resource usage data 104.

The input data 104 defines the compound coefficient 103 that controls extra computational resources used for scaling the baseline architecture. In other words, the compound coefficient 103 controls the amount of computational resources that may be used by the scaled final architecture as compared to the resources used by the baseline architecture. In some cases, the system 100 may generate a value for the compound coefficient based on a user's constraint. For example, if a user wants to make the baseline architecture (102) N times bigger, then the system may generate the compound coefficient $\phi=\log_2 (N)$. For instance, if the user wants to enlarge the baseline architecture 4 times, then $\phi=2$. If the user wants to enlarge the baseline model 32 times then $\phi=5$.

The input data 104 may further specify a target amount of computational resources used by the final architecture. In particular, the target resource usage data specifies (i) a target memory size that indicates the maximum memory size allowed for creating the final architecture, i.e., the maximum memory that can be taken up by parameters and architecture data of the final architecture, and (ii) a target number of operations (e.g. FLOPS) that indicates the maximum number of operations that the final architecture can execute to perform the particular machine learning task.

The baseline architecture 102 is an architecture that has been trained to perform the particular machine learning task. The baseline architecture 102 has a network width dimension, a network depth dimension, and a resolution dimension. The baseline architecture 102 has a plurality of neural network layers. In some implementations, the baseline architecture 102 has a plurality of network stages and each of the plurality of network stages has a plurality of neural network layers. A network stage includes a group of neural network layers of the same type. That means the plurality of neural network layers in each network stage of the baseline architecture share the same architecture, i.e., perform the same type of operation on the same size input tensor to generate the same size output tensor.

The network depth dimension of the baseline architecture 102 is a set of numbers of layers in the plurality of network stages of the baseline architecture. Each neural network layer in the baseline architecture 102 is configured to receive an input tensor from a previous layer and to generate, for the input tensor, an output tensor to be fed as input to the next neural network layer. The input tensor to any given layer has a height dimension, a width dimension, and a channel dimension that specifies a number of channels in the input tensor.

The network width dimension of the baseline architecture 102 is a set of the numbers of input channels associated with input tensors to the plurality of neural network layers of the baseline architecture 102.

The resolution dimension of the baseline architecture 102 is a set of height dimensions and width dimensions of input tensors to the plurality of neural network layers of the baseline architecture 102.

For example, the baseline architecture 102 can be represented as:

$$\mathcal{N} = \bigodot_{i=1...s} \mathcal{F}_i^{L_i}(X_{(H_i, W_i, C_i)}) \qquad (1)$$

where $\mathcal{F}$ denotes layer $F_i$ is repeated $L_i$ times in stage i, $(H_i, W_i, C_i)$ denotes the shape of input tensor X of layer $F_i$ where $H_i$ is the height dimension, $W_i$ is the width dimension and $C_i$ is the channel dimension.

Figure 3:
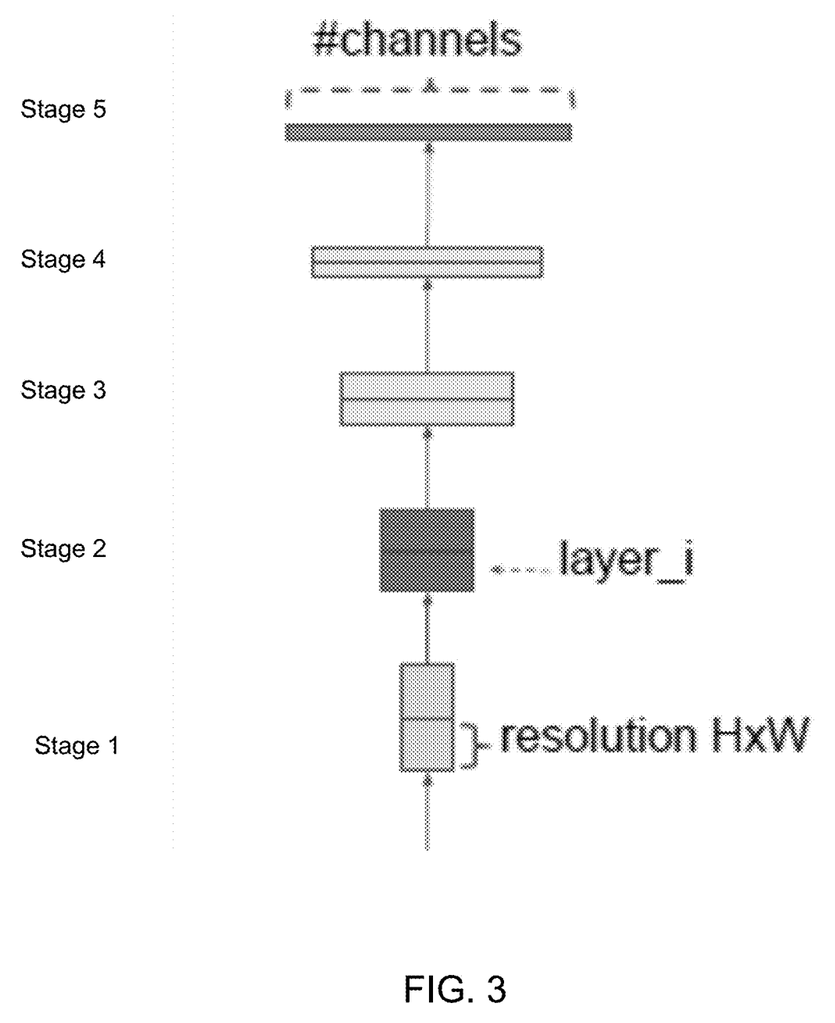
FIG. 3 illustrates an example baseline architecture of a neural network.

FIG. 3 illustrates an example of the baseline architecture 102 that has 5 stages. In this example architecture the spatial dimension (height and width dimensions) is gradually shrunk but the channel dimension is expanded over layers, for example, from initial input shape (224, 224, 3) to final output shape (7, 7, 512).

Unlike previous approaches that mostly focus on finding the best layer architecture $F_i$ (i.e., finding the best type of operation performed by the layer $F_i$), the model scaling techniques described in this specification expands the network length ($L_i$), width ($C_i$), and/or resolution ($H_i$; $W_i$) without changing $F_i$ predefined in the baseline architecture 102. By fixing the type of operation of layer $F_i$, the model scaling techniques described herein simplify the design problem for new resource constraints relative to previous approaches. However, there still remains a large design space to explore possible combinations of different $L_i$; $C_i$;

$H_i$; $W_i$ for each layer. In order to further reduce the design space, the system 100 may restrict that all layers must be scaled uniformly with a constant ratio.

Given the target amount of computational resources specified by the input data 104, the system 100 aims to maximize the model accuracy for the given computational resources constraint, which can be formulated as an optimization problem as follows:

$$\max_{d,\omega,r} \text{Accuracy}(\mathcal{N}(d, \omega, r)) \quad (2)$$

$$\text{s.t.} \quad \mathcal{N}(d, \omega, r) = \bigodot_{i=1\ldots s} \hat{\mathcal{F}}_i^{d \cdot \hat{L}_i}\left(X_{(r \cdot \hat{H}_i, r \cdot \hat{W}_i, \omega \cdot \hat{C}_i)}\right)$$

$$\text{Memory}(\mathcal{N}) \leq \text{target\_memory}$$

$$\text{FLOPS}(\mathcal{N}) \leq \text{target\_flops}$$

where w, d, r, are width, depth and resolution coefficients for scaling the network width, depth, and resolution dimensions, respectively; $\hat{F}_i$, $\hat{L}_i$, $\hat{H}_i$, $\hat{W}_i$, $\hat{C}_i$ are predefined parameters in the obtained baseline architecture 102; target_memory indicates the maximum memory size allowed for creating the final architecture and target-flops indicates the maximum number of operations that the final architecture can execute to perform the particular machine learning task; $\mathcal{N}$ represents a neural network architecture that has been created by scaling the network width, depth, and resolution dimensions of the baseline architecture 102 using the depth, width and resolution coefficient d, w, r; FLOPS(N) represents the number of operations executed by the neural network architecture N to perform the particular machine learning task; Memory(N) represents the memory used for creating the neural network architecture N, i.e., the memory that is taken up by parameters and architecture data of the neural network architecture N.

Generally, to determine the final architecture from the baseline architecture, the system 100 employs a compound scaling method, which uses a compound coefficient ϕ to uniformly scale the network width, depth, and resolution dimensions in a principled way. For example, the compound scaling method can be expressed as:

depth: $d=\alpha^\phi$ width: $w=\beta^\phi$ resolution: $r=\gamma^\phi$ s.t. $\alpha \cdot \beta^2 \cdot \gamma^2 \approx 2$ $\alpha \geq 1, \beta \geq 1, \gamma \geq 1$ \quad (3)

where α, β, γ are baseline depth coefficient, baseline width coefficient, and baseline resolution coefficient, respectively. α, β, γ can be determined by a search, for example, by a grid search based on the above Equations 2 and 3. Intuitively, ϕ controls how many more resources are available for model scaling, while α, β, γ specify how to assign these extra resources to the network depth, width, and resolution dimensions respectively. It is noted that the number of operations (i.e., FLOPS) of a regular convolution operation is proportional to d, $w^2$, $r^2$, i.e., doubling the network depth dimension will double FLOPS, but doubling the network width or resolution dimension will increase FLOPS by four times. When the baseline architecture is a convolutional neural network, convolution operations would dominate the computation cost in the baseline architecture, thus scaling the baseline architecture with Equation 3 will approximately increase total FLOPS by $(\alpha \cdot \beta^2 \cdot \gamma^2)^\phi$. The constraint $\alpha \cdot \beta^2 \cdot \gamma^2 \approx 2$ ensures that for any compound coefficient ϕ, the total operations (i.e., FLOPS( )) will approximately increase by $2^\phi$.

To determine the final architecture 126, the system 100 performs a search (e.g., a grid search, a random search or other search strategy) to search for a baseline depth coefficient α (110), a baseline width coefficient β (108), and a baseline resolution coefficient γ (112) that specifies how to assign the extra computational resources to the network depth dimension, the network width dimension, and the resolution dimension of the baseline architecture, respectively. Performing a search is described in detail below with reference to FIG. 2.

The system 100 generates the width coefficient 114 based on the value of the compound coefficient 103 and the baseline width coefficient 108, generates the depth coefficient 116 based on the value of the compound coefficient 103 and the baseline depth coefficient 110, and generates the resolution coefficient 118 based on the value of the compound coefficient 103 and the baseline resolution coefficient 112.

For example, in some implementations, the system 100 may generate the width, depth and resolution coefficients using the above Equation 3.

In some other implementations, as shown in Equation 4 below, the system 100 may generate the width coefficient 114 by summing a constant and a product of the baseline width coefficient 108 and the value of the compound coefficient 103. The system 100 may generate the depth coefficient 116 by summing the constant and a product of the baseline depth coefficient 110 and the value of the compound coefficient 103. The system 100 may generate the resolution coefficient 118 by summing the constant and a product of the baseline resolution coefficient 112 and the value of the compound coefficient 103.

network depth coefficient: $d=1+\alpha \cdot \phi$ network width coefficient: $w=1+\beta \cdot \phi$ network resolution coefficient: $r=1+\gamma \cdot \phi$ \quad (Equation 4)

After the depth, width, and resolution coefficients (d, w, r) are generated for the compound coefficient, the system 100 generates the final architecture 126 by scaling the network depth, network width, and resolution dimensions of the baseline architecture 102 based on the corresponding depth, width, and resolution coefficients. In particular, the system 100 scales the network width dimension of the baseline architecture 102 by the width coefficient, scales the network depth dimension of the baseline architecture 102 by the depth coefficient, and scales the resolution of the baseline architecture 102 by the resolution coefficient to generate the final architecture 126.

The system 100 can then output architecture data 150 that specifies the final architecture of the neural network, i.e., data specifying the layers that are part of the final architecture, the connectivity between the layers, and the operations performed by the layers. For example, the system 100 can output the architecture data 150 to the user who submitted the training data. In some cases, the data 150 also includes trained values of the parameters of the final architecture from the training of the candidate architecture that was identified as the final architecture.

In some implementations, instead of or in addition to outputting the architecture data 150, the system 100 trains an instance of the neural network having the final architecture, e.g., either from scratch or to fine-tune the parameter values generated as a result of training the candidate architecture that was identified as the final architecture, and then uses the trained neural network to process requests received by users, e.g., through the API provided by the system 100. That is, the system 100 can receive inputs to be processed, use the trained neural network having the final architecture to process the inputs, and provide the outputs generated by the trained neural network or data derived from the generated outputs in response to the received inputs.

Figure 2:
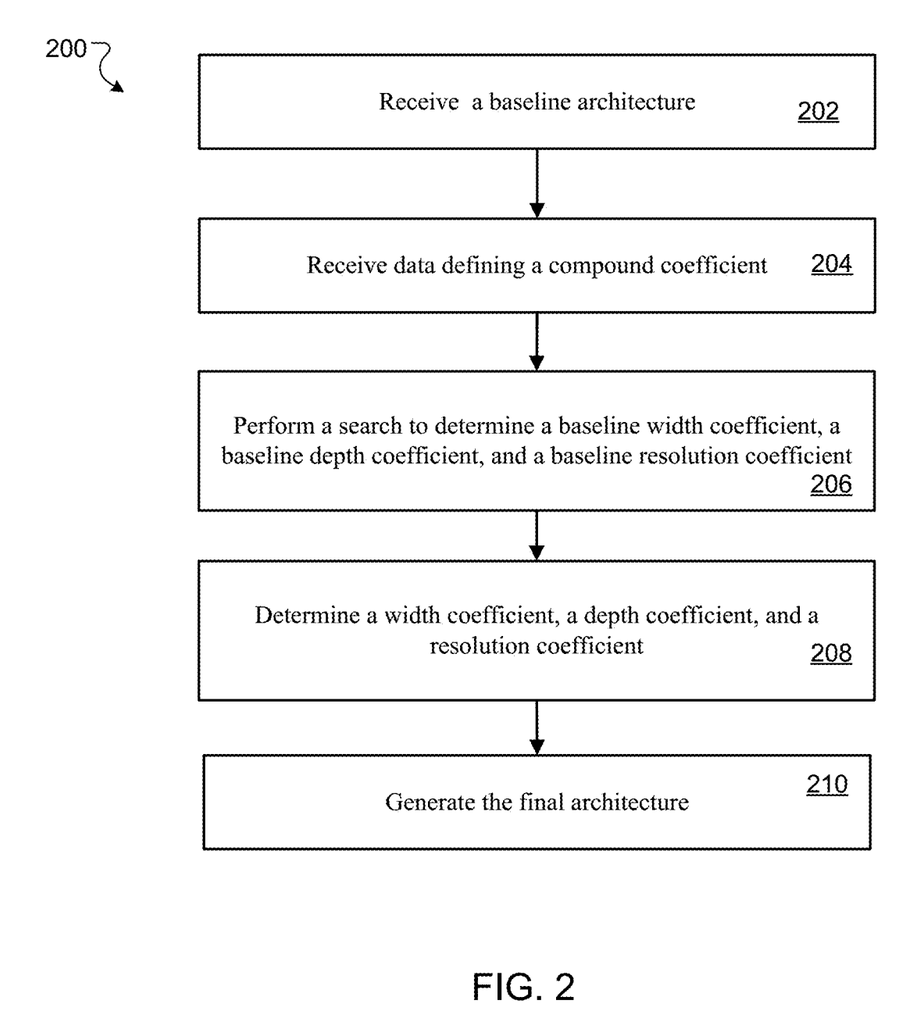
FIG. 2 a flow diagram of an example process for determining a final architecture for a neural network to perform a particular machine learning task.

FIG. 2 a flow diagram of an example process for determining a final architecture for a neural network to perform a particular machine learning task. For convenience, the process 300 will be described as being performed by a system of one or more computers located in one or more locations. For example, a neural architecture search system, e.g., the neural architecture search system 100 of FIG. 1, appropriately programmed, can perform the process 200.

The system receives a baseline architecture for the neural network (step 202). The baseline architecture has been trained to perform the particular machine learning task. The baseline architecture has a network width dimension, a network depth dimension, and a resolution dimension. The baseline architecture has a plurality of network stages and each of the plurality of network stages has a plurality of neural network layers. The plurality of neural network layers in each network stage of the baseline architecture share the same architecture.

The network depth dimension of the baseline architecture is a set of numbers of layers in the plurality of network stages of the baseline architecture. Each neural network layer in the baseline architecture is configured to receive an input tensor from a previous layer and to generate, for the input tensor, an output tensor to be fed as input to the next neural network layer. The input tensor has a height dimension, a width dimension, and a channel dimension that specifies a number of channels in the input tensor.

The network width dimension of the baseline architecture is a set of numbers of input channels associated with input tensors to the plurality of neural network layers of the baseline architecture.

The resolution dimension of the baseline architecture is a set of height dimensions and width dimensions of input tensors to the plurality of neural network layers of the baseline architecture.

The system receives input data that defines a compound coefficient that controls extra computational resources used for scaling the baseline architecture (step 204). In other words, the compound coefficient controls the amount of computational resources that may be used by the scaled final architecture as compared to the resources used by the baseline architecture. In some cases, the system may generate a value for the compound coefficient based on a user's constraint. For example, if a user wants to make the baseline architecture (102) N times bigger, then the system may generate the compound coefficient $\phi = \log_2(N)$. For instance, if the user wants to enlarge the baseline architecture 4 times, then $\phi=2$. If the user wants to enlarge the baseline model 32 times then $\phi=5$.

The input data may further specify a target amount of computational resources used by the final architecture. In particular, the target resource usage data specifies (i) a target memory size that indicates the maximum memory size allowed for creating the final architecture, i.e., the maximum memory that can be taken up by parameters and architecture data of the final architecture, and (ii) a target number of operations that indicates the maximum number of operations that the final architecture can execute to perform the particular machine learning task.

To generate the final architecture, the system performs a search (e.g., a grid search, a random search or other search strategy) to determine a baseline width coefficient $\beta$, a baseline depth coefficient $\alpha$, and a baseline resolution coefficient $\gamma$ that specifies how to assign the extra computational resources to the network width dimension, the network depth dimension, and the resolution dimension of the baseline architecture, respectively (step 206). For example, given that the compound coefficient value is 1 and given twice as many resources are available for the larger model, the system performs a grid search of $\alpha$, $\beta$, $\gamma$ based on Equations 2 and 3 and finds the best values for these baseline coefficients as follows: $\alpha=1.2$, $\beta=1.1$, $\gamma=1.15$, under constraint of $\alpha \cdot \beta^2 \cdot \gamma^2 = 2$.

To perform a grid search, the system repeatedly performs the following steps:
  (a) selecting a search value of the baseline width coefficient, a search value of the baseline depth coefficient, and a search value of the baseline resolution coefficient;
  (b) generating a search width coefficient w', a search depth coefficient d', and a search resolution coefficient r' based on (i) the given value of compound coefficient, and (ii) the search values of the baseline width, depth and resolution coefficients, respectively (for example, by using Equation 3 or 4);
  (c) generating a search candidate architecture using the baseline architecture and the search width coefficient, the search depth coefficient, and the search resolution coefficient (e.g., by scaling the network width dimension of the baseline architecture by the search width coefficient, scaling the network depth dimension of the baseline architecture by the search depth coefficient; and scaling the resolution of the baseline architecture by the search resolution coefficient; and
  (d) determining, for the search candidate architecture, a performance score representing performance of the search candidate architecture on the particular machine learning task. For example, the performance score can be an accuracy score representing an accuracy of the search candidate architecture on the particular machine learning task. In particular, the system can train an instance of neural network having the search candidate architecture on the particular machine learning task to determine values of parameters of the instance of neural network having the search candidate architecture. The system can then determine an accuracy score of the trained instance of neural network based on the performance of the trained instance of neural network on the particular neural network task. For example, the accuracy score can represent an accuracy of the trained instance on a validation set as measured by an appropriate accuracy measure. For instance, the accuracy score can be a perplexity measure when outputs are sequences or a classification error rate when the particular neural network task is a classification task. As another example, the accuracy score can be an average or a maximum of the accuracies of the instance for each of the last two, five, or ten epochs of the training of the instance.

The system then selects, as the final values for the baseline depth, width and resolution coefficients, the search values that are associated with the maximum performance score among performance scores of all search candidate architectures that have been generated.

The system may select the search values for the baseline width, depth and resolution coefficients at step (a) by sampling values for each coefficient (subject to a constraint) from a grid of possible values for the search. For example, the system may sample values for each coefficient from a grid of possible values between 1 and 2, under a constraint of $\alpha \cdot \beta^2 \cdot \gamma^2 \approx 2$.

After obtaining the baseline width coefficient $\beta$, the baseline depth coefficient $\alpha$, and the baseline resolution coefficient $\gamma$, the system determines a width coefficient, a depth coefficient and a resolution coefficient (step 208).

In some implementations, the system may generate the width, depth and resolution coefficients based on the baseline width, depth and resolution coefficients and the value of the compound coefficient using Equation 3.

In some other implementations, as shown in Equation 4, the system may generate the width coefficient by summing a constant and a product of the baseline width coefficient and the value of the compound coefficient. The system may generate the depth coefficient by summing the constant and a product of the baseline depth coefficient and the value of the compound coefficient. The system may generate the resolution coefficient by summing the constant and a product of the baseline resolution coefficient and the value of the compound coefficient.

The system generates the final architecture by scaling the network width, network depth, and resolution dimensions of the baseline architecture based on the corresponding width, depth, and resolution coefficient, respectively (step 210). In particular, the system scales the network width dimension of the baseline architecture by the width coefficient, scales the network depth dimension of the baseline architecture by the depth coefficient, and scales the resolution of the baseline architecture by the resolution coefficient to generate the final architecture.

A neural network in accordance with the identified final architecture may then be used for performing the machine learning task. In addition or alternatively, information characterizing the identified final architecture may be output (e.g. to a remote computer system) for use in constructing a neural network having the final architecture.

In some implementations, the system can generate multiple larger architectures by performing process 300 for multiple different compound coefficients. This could allow the system or the users to select which larger architecture fits best (e.g., which larger architecture has the best performance score among the generated multiple larger architectures) given the amount of resources available for running the architecture at any given time (e.g., given the target amount of computational resources specified by the input data).

Figure 4:
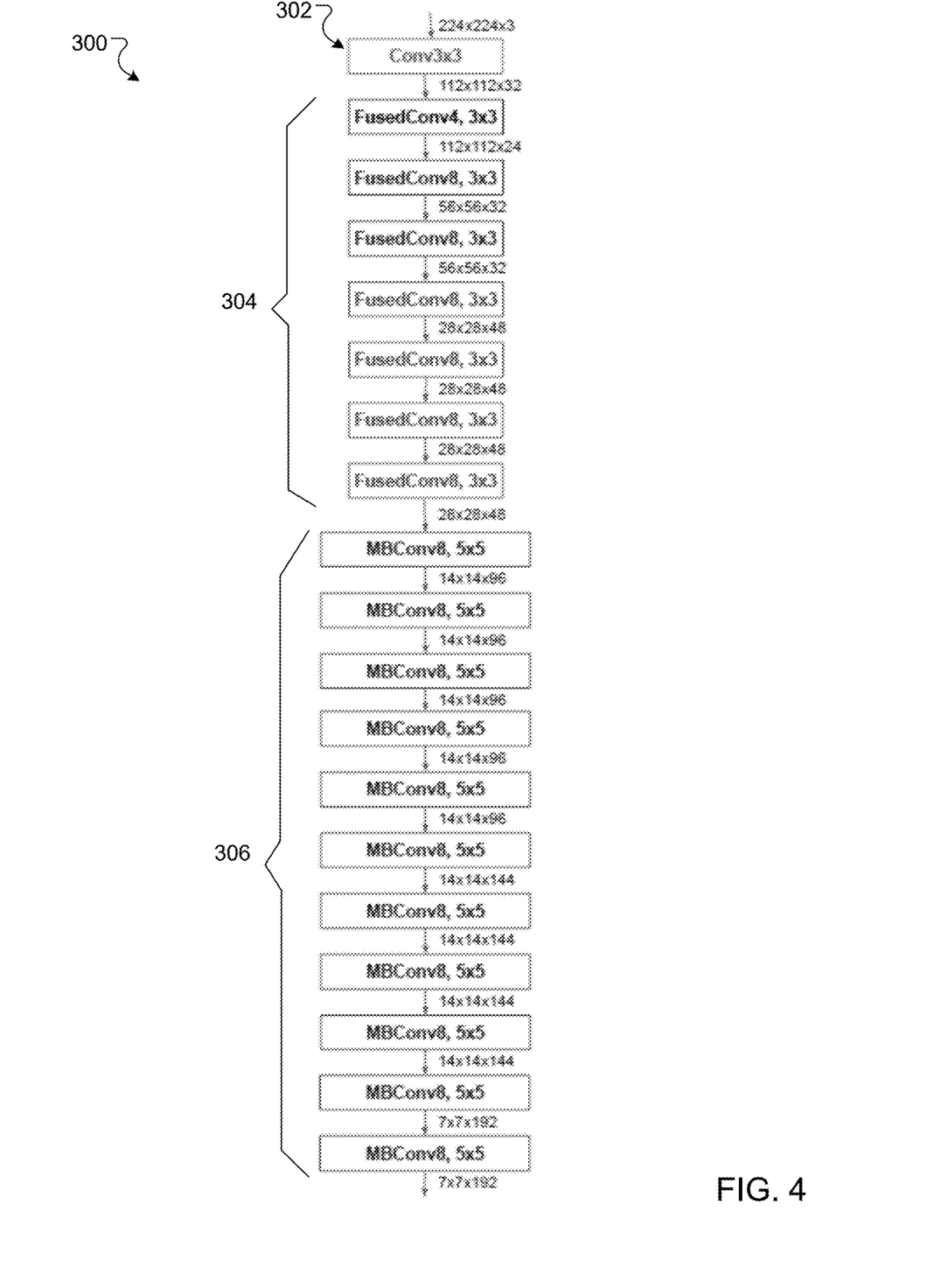
FIG. 4 illustrates another example baseline architecture of a neural network.

FIG. 4 illustrates another example baseline architecture that can be used to generate various final architectures using the above-described model scaling techniques. The baseline architecture 300 includes a convolutional neural network layer 302 followed by a plurality of FusedConv neural network layers 304 followed by a plurality of MBConv neural network layers 306.

FusedConv is a type of convolutional neural network layer that includes a regular convolutional neural network sub-layer followed by a pointwise convolutional neural network sub-layer. There is no depthwise convolutional neural network sub-layer used in FusedConv.

MBConv is a type of convolutional neural network layer that includes a pointwise convolutional neural network sub-layer followed by a depthwise convolutional neural network sub-layer followed by a pointwise convolutional neural network sub-layer. Examples of MBConv can be found in Sandler, M., Howard, A., Zhu, M., Zhmoginov, A., and Chen, L.-C. Mobilenetv2: Inverted residuals and linear bottlenecks. CVPR, 2018, and Tan, M., Chen, B., Pang, R., Vasudevan, V., Sandler, M., Howard, A., and Le, Q. V. MnasNet: Platform-aware neural architecture search for mobile. CVPR, 2019.

The final architectures that are generated by scaling the baseline architecture 300 using compound coefficients may also be referred to as "EfficientNet-Edge TPU" architectures, which are customized to run optimally on special-purpose hardware accelerators that are designed to be run on a device (e.g., on the Google's Edge TPU) rather than in the cloud. Through such model customizations, the EfficientNet-Edge TPU architectures are able to provide real-time image classification performance while simultaneously achieving accuracies typically seen only when running much larger, compute-heavy models in data centers.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network. In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device. While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A neural network system implemented by one or more computers, the neural network system comprising:
   an output neural network generated by linearly scaling a network width dimension, a network depth dimension, and a resolution dimension of a baseline neural network architecture based on a corresponding width coefficient, a depth coefficient, and a resolution coefficient, respectively, and based on a compound coefficient;
   wherein the baseline neural network architecture comprises a convolutional neural network layer followed by a plurality of FusedConv neural network layers followed by a plurality of MBConv neural network layers;
   wherein the output neural network is configured to run on one or more special-purpose hardware accelerators that are configured on a device.

2. The neural network system of claim 1, wherein a FusedConv neural network layer comprises a convolutional neural network sub-layer followed by a pointwise convolutional neural network sub-layer.

3. The neural network system of claim 1, wherein a MBConv neural network layer comprises a pointwise convolutional neural network sub-layer followed by a depthwise convolutional neural network sub-layer followed by a pointwise convolutional neural network sub-layer.

4. The neural network system of claim 1, wherein the convolutional neural network layer is a 3×3 convolutional neural network layer.

5. The neural network system of claim 1, wherein the plurality of FusedConv neural network layers comprises seven FusedConv neural network layers.

6. The neural network system of claim 1, wherein the plurality of FusedConv neural network layers comprises a plurality of 3×3 FusedConv neural network layers.

7. The neural network system of claim 1, wherein the plurality of MBConv neural network layers comprises eleven MBConv neural network layers.

8. The neural network system of claim 1, wherein the plurality of MBConv neural network layers comprises a plurality of 5×5 MBConv neural network layers.

9. The neural network system of claim 1, wherein the output neural network is configured to perform a machine learning task.

10. The neural network system of claim 9, wherein the machine learning task is one of (i) an image classification task, (ii) an image embedding generation task, (iii) an object detection task, (iv) a video classification task, (v) a speech recognition task, or (vi) a text classification task.

11. A computer-implemented method comprising:
    receiving a baseline neural network architecture comprising a convolutional neural network layer followed by a plurality of FusedConv neural network layers followed by a plurality of MBConv neural network layers; and
    generating an output neural network from the received baseline neural network architecture, comprising:
       linearly scaling a network width dimension, a network depth dimension, and a resolution dimension of the baseline neural network architecture based on a corresponding width coefficient, a depth coefficient, and a resolution coefficient, respectively, and based on a compound coefficient;
    wherein the output neural network is configured to run on one or more special-purpose hardware accelerators that are configured on a device.

12. The computer-implemented method of claim 11, wherein a FusedConv neural network layer comprises a convolutional neural network sub-layer followed by a pointwise convolutional neural network sub-layer.

13. The computer-implemented method of claim 11, wherein a MBConv neural network layer comprises a pointwise convolutional neural network sub-layer followed by a depthwise convolutional neural network sub-layer followed by a pointwise convolutional neural network sub-layer.

14. The computer-implemented method of claim 11, wherein the convolutional neural network layer is a 3×3 convolutional neural network layer.

15. The computer-implemented method of claim 11, further comprising:
    receiving a network input; and
    processing, using the output neural network, the network input to generate a network output for the network input to perform a machine learning task.

16. The computer-implemented method of claim 15, wherein the machine learning task is one of (i) an image classification task, (ii) an image embedding generation task, (iii) an object detection task, (iv) a video classification task, (v) a speech recognition task, or (vi) a text classification task.

17. One or more non-transitory computer-readable storage media storing instructions that, when executed by one or more computers, cause the one or more computers to perform operations comprising:
    receiving a baseline neural network architecture comprising a convolutional neural network layer followed by a plurality of FusedConv neural network layers followed by a plurality of MBConv neural network layers; and
    generating an output neural network from the received baseline neural network architecture, comprising:
       linearly scaling a network width dimension, a network depth dimension, and a resolution dimension of the baseline neural network architecture based on a corresponding width coefficient, a depth coefficient, and a resolution coefficient, respectively;

wherein the output neural network is configured to run on one or more special-purpose hardware accelerators that are configured on a device.

18. The one or more non-transitory computer-readable storage media of claim 17, wherein the operations further comprise:
   receiving a network input; and
   processing, using the output neural network, the network input to generate a network output for the network input to perform a machine learning task.

19. The one or more non-transitory computer-readable storage media of claim 18, wherein the machine learning task is one of (i) an image classification task, (ii) an image embedding generation task, (iii) an object detection task, (iv) a video classification task, (v) a speech recognition task, or (vi) a text classification task.

* * * * *